United States Patent Office 3,390,187
Patented June 25, 1968

3,390,187
SIDE CHAIN CHLORINATION OF 2,4,5-TRICHLOROACETOPHENONES
Jürgen F. Falbe, Bonn, and Hans Tetteroo, Hoholz, Germany, assignors to Shell Oil Company, New York, N.Y., a corporation of Delaware
No Drawing. Filed Apr. 7, 1967, Ser. No. 629,118
Claims priority, application Germany, Oct. 21, 1966, S 106,643
4 Claims. (Cl. 260—592)

ABSTRACT OF THE DISCLOSURE

Preparation of dichloroacetyl-2,4,5-trichlorobenzene by controlled chlorination of a mixture of 2,4,5- and 2,3,6-trichloroacetophenone.

---

Dichloroacetyl-2,4,5-trichlorobenzene is useful as a starting material for the preparation of a highly active insecticide, dimethyl 1-(2,4,5-trichlorophenyl)-2-chlorovinyl phosphate, which is disclosed in Phillips-Ward U.S. Patent 3,102,842, issued Sept. 3, 1963.

Certain polyhaloacetophenones have been prepared by the Friedel-Crafts reaction, as shown by the French Patent 1,330,953, June 28, 1963, in which a halobenzene is condensed with chloroacetyl chloride. E. E. Gilbert et al. U.S. 3,003,916, Oct. 10, 1961, suggest high-temperature chlorination, e.g. 120–140° C., of ring-halogenated acetophenones to chlorinate the side chain. J. G. Aston et al., in Organic Synthesis, Coll. Vol. III, 538, John Wiley and Co., New York, 1955, disclose the side-chain chlorination of unsubstituted acetophenone in glacial acetic acid at temperatures below 60° C. Similar findings are described in Mauri in Farmaco, Ed. Prat. 18 (1963), 651. All these processes are disadvantageous in that either the starting materials are difficult to obtain or the products are of insufficient purity and obtained in unsatisfactory yields or the reaction time is slow.

In particular, the synthesis of dichloroacetyl-2,4,5-trichlorobenzene is disclosed by the German Patent 1,223,-824, which teaches the side chain chlorination of 2,4,5-trichloroacetophenones in the presence of hydrogen chloride with formic acid as a solvent. However, this chlorination produces an isomeric mixture of 90% dichloroacetyl-2,4,5-trichlorobenzene and 10% dichloroacetyl-2,3,6-trichlorobenzene. Since the physical properties of the above isomers are largely identical, physical separation is practically impossible.

The 2,3,6-trichloro-isomer reacts with trimethyl phosphate to produce the 2,3,6-trichloro-isomer of the abovementioned insecticide. This isomer has higher mammalian toxicity and is a less effective insecticide than the 2,4,5-trichloro-isomer. Therefore, it is highly desirable to avoid production of the 2,3,6-trichloro-isomer in the synthesis of dichloroacetyl - 2,4,5 - trichloroacetophenone. This latter isomer can then be reacted in its uncontaminated state to form the desired insecticide.

OBJECTS

It is an object of this invention to provide an improved process for the side-chain chlorination of 2,4,5-trichloroacetophenone. It is a further of the invention to afford a process for the above reaction which avoids the dichlorination of the 2,3,6-trichloroacetophenone isomer.

STATEMENT OF THE INVENTION

These objects are accomplished in the process of the preparation of dichloroacetyl-2,4,5-trichlorobenzene by chlorinating a mixture of 2,4,5- and 2,3,6-trichloroacetophenone with chlorine in the presence of hydrogen chloride in a solvent consisting of at least 50% by weight of formic acid, wherein the improvement of the invention comprises stopping the chlorination when the monochloroacetyl trichlorobenzene content in the reaction mixture is approximately equal to the 2,3,6-trichloroacetophenone content in the starting material.

The dichloroacetyl-2,4,5-trichlorobenzene has substantially different physical properties than the monochloroacetyl trichlorobenzene. Therefore, physical separation is practical and economical.

REACTION MECHANISM

It has been found in accordance with the invention that under constant reaction conditions the side-chain chlorination of 2,3,6-trichloroacetophenone proceeds at a slightly slower rate than that of the isomeric 2,4,5-trichloroacetophenone. Hence, the 2,3,6-trichloroacetophenone forms a compound which contains only one chlorine atom in the acetyl group while the 2,4,5-trichloroacetophenone is simultaneously converted further to dichloroacetyl-2,4,5-trichlorobenzene.

The chlorination reaction has been analyzed by gas chromatography which revealed that when the conversion of starting material is complete, substantially all of the 2,3,6-trichloroacetophenone present in the starting material has been converted to monochloroacetyl-2,3,6-trichlorobenzene, while the greater part of the 2,4,5-trichloroacetophenone has been converted to dichloroacetyl-2,4,5-trichlorobenzene. In addition a small quantity of monoacetyl-2,4,5-trichlorobenzene and the trichloroacetyl isomers are formed.

Consequently, by analytically following the formation of monoacetyl trichlorobenzenes, it is possible to determine the point at which the chlorination should be stopped. When the quantity of monochloroacetyl trichlorobenzenes is approximately equal to that of the 2,3,6-trichloroacetophenone originally in the starting materials, the maximum conversion to the desired product has been obtained. However, to insure this maximum conversion, the reaction should be interrupted when the quantity of the monochloroacetyl trichlorobenzenes exceeds the corresponding quantity of 2,3,6-trichloroacetophenone in the starting material by about 10–30%.

PREPARATION

The mixture of the trichloroacetophenones are chlorinated in liquid phase in the presence of hydrogen chloride and a suitable solvent at temperatures of about 20° C. to 60° C., with the preferred temperature being in the range of 25° C. to 35° C. The chlorination may be carried out at atmospheric pressure and with the exclusion of light, or at reduced or elevated pressures and with exposure to light.

Hydrogen chloride is used as a catalyst and may be in gas or liquid phase. A quantity of 0.1%–5% by weight of hydrogen chloride, based on the quantity of solvent, is preferred. The hydrogen chloride may be added entirely at the beginning of the reaction, or intermittently during the course of the reaction.

The solvent may be alkanoic acids having less than five carbon atoms, for example, acetic acid, propionic acid and butyric acid. However, formic acid is preferred as it has been found that the chlorination time is much shorter if the reaction is conducted in this medium. It is preferred to use at least 98% formic acid in a quantity by weight of from 3.5 to 1.5 times that of the 2,4,5-trichloroacetophenone employed.

Normally, the reaction is interrupted after about 10–15 hours of reaction time at a temperature of between about 20° C. to 60° C.

The dichloroacetyl-2,4,5-trichlorobenzene can be separated from the reaction mixture by gas chromatography.

However, since it is preferably used for the preparation of insecticidal dimethyl 1-(2,4,5-trichlorophenyl)chlorovinyl phosphate by reaction with trimethyl phosphite, isolation is not necessary owing to the fact that the reaction of mono- and trichloroacetyltrichlorobenzenes with trimethyl phosphite proceeds at a considerably slower rate so that these isomers remain behind in the reaction mixture upon extraction of the insecticide.

The novel and improved features of the process of the invention are illustrated by the following examples. It should be understood, however, that the examples are merely illustrative and are not to be regarded as limitations to the appended claims, since the basic teachings thereof may be varied at will as will be understood by one skilled in the art. In the examples, the proportions are given in parts by weight unless otherwise noted.

In the following examples the starting material was a mixture of 2,4,5-trichloroacetophenone and 2,3,6-trichloroacetophenone which had been prepared from 2 moles of 1,2,4-trichlorobenzene, 1.6 moles of aluminum chloride and 1 mole of acetyl chloride at a temperature of 90° C.

Example 1

A quantity of 500 grams of a mixture of 2,4,5-trichloroacetophenone having a 2,3,6-trichloroacetophenone content of 8.3% by weight was dissolved in 2500 cc. of technical grade formic acid (98–100%). The mixture was heated to 30° C. and hydrogen chloride was added in the dark for 10 minutes at a rate of 2–3 liters/hour.

Subsequently, while hydrogen chloride was being added, chlorine was introduced, with vigorous stirring, in such a quantity that the rate of supply to the vessel was about 25 liters/hour during the first hour and that the effluent gases (chlorine and hydrogen chloride) left the vessel at the rate of 4–5 liters/hour. Every hour a sample was taken from the mixture, freed from formic acid in vacuo and analyzed by gas chromatography. After four hours a quantity of 12.1% by weight of the starting material was left.

The quantity of monochloroacetyl trichlorobenzenes was 41.9% by weight, of dichloroacetyl trichlorobenzene 44.8% by weight, and of trichloroacetyl trichlorobenzenes 1.2% by weight. After 6 hours the corresponding figures were 2.1% by weight of starting material, 25.3% by weight of monochloroacetyl compound, 70.8% by weight of dichloroacetyl compound and 1.8% by weight of trichloroacetyl compound. The reaction was stopped after 13 hours. The entire quantity of starting material had been converted.

The reaction product consisted of 85.2% by weight of dichloroacetyl-2,4,5-trichlorobenzene, 7.8% by weight of monochloroacetyl-2,3,6-trichlorobenzene, 3.1% by weight of monochloro-2,4,5-trichlorobenzene and 3.9% by weight of trichloroacetyl-trichlorobenzenes.

Example 2

The procedure of Example 1 was repeated, except that only 1500 cc. of formic acid were used as solvent. The results are shown in the following table.

TABLE

| Reaction Time, hours | Reaction Products (percent by weight) | | | |
|---|---|---|---|---|
| | Starting Material | Mono- | di- | Trichloroacetyl Compound |
| 1 | 2.4 | 44.7 | 50.5 | 2.5 |
| 4 | 1.2 | 33.9 | 60.7 | 4.2 |
| 6 | 0.4 | 24.4 | 71.9 | 3.3 |
| 93 | | 16.3 | 79.7 | 4.3 |
| 19 | | 15.4 | 82.0 | 4.5 |

The dichloroacetyl trichlorobenzene fraction consisted substantially exclusively of the 2,4,5-trichloro compound.

Example 3

The procedure of Example 1 was repeated at 40° C. with 500 cc. of formic acid as solvent. After 7 hours the reaction was stopped. The reaction product contained 0.3% by weight of starting material, 75% by weight of dichloroacetyl-2,4,5-trichlorobenzene, 20.5% by weight of monoacetyl trichlorobenzene and 4.3% by weight of trichloroacetyl trichlorobenzenes.

We claim as our invention:

1. In the process of preparing dichloroacetyl-2,4,5-trichlorobenzene comprising reacting a mixture of 2,4,5- and 2,3,6-trichloroacetophenone with chlorine in the presence of a catalytic amount of hydrogen chloride in a solvent consisting essentially of at least 98% formic acid and 2 to 4 carbon atom alkanoic acids, the improvement comprising stopping the chlorination when the monochloroacetyltrichlorobenzene content of the reaction mixture is approximately equal to the 2,3,6-trichloroacetophenone content of the starting material and separating the dichloroacetyl-2,4,5-trichlorobenzene from the reaction mixture.

2. The process of claim 1 wherein the solvent used contains formic acid in a quantity by weight of from 3.5 to 7.5 times that of 2,4,5-trichloroacetophenone.

3. The process of claim 1 wherein the chlorination is carried out at temperatures of from 20° C. to 60° C.

4. The process of claim 1 wherein the dichloroacetyl-2,4,5-trichlorobenzene is separated from the crude reaction mixture by reaction with trimethyl phosphite.

References Cited

UNITED STATES PATENTS 3,297,798  1/1967  Phillips _____ 260—592

DANIEL D. HORWITZ, *Primary Examiner.*